E. W. BRACKENBURY.

TILTING DEVICE FOR CONCRETE MIXERS.

APPLICATION FILED DEC. 10, 1913.

Reissued June 6, 1916. 14,145.

WITNESSES:

Charles G. Simonds

F. A. Otto.

INVENTOR.

Edward W. Brackenbury

BY

Albert E. Smith

ATTORNEY

UNITED STATES PATENT OFFICE.

EDWARD WINGFIELD BRACKENBURY, OF MILWAUKEE, WISCONSIN, ASSIGNOR TO THE T. L. SMITH CO., OF MILWAUKEE, WISCONSIN, A CORPORATION OF WISCONSIN.

TILTING DEVICE FOR CONCRETE MIXERS.

14,145. Specification of Reissued Letters Patent. Reissued June 6, 1916.

Original No. 1,051,673, dated January 28, 1913, Serial No. 674,022. Application for reissue filed December 10, 1913. Serial No. 805,870.

*To all whom it may concern:*

Be it known that I, EDWARD W. BRACKENBURY, a subject of the King of England, residing at Milwaukee, in the county of Milwaukee and State of Wisconsin, have invented a new and useful Tilting Device for Concrete-Mixers, of which the following is a specification.

Figure 1:
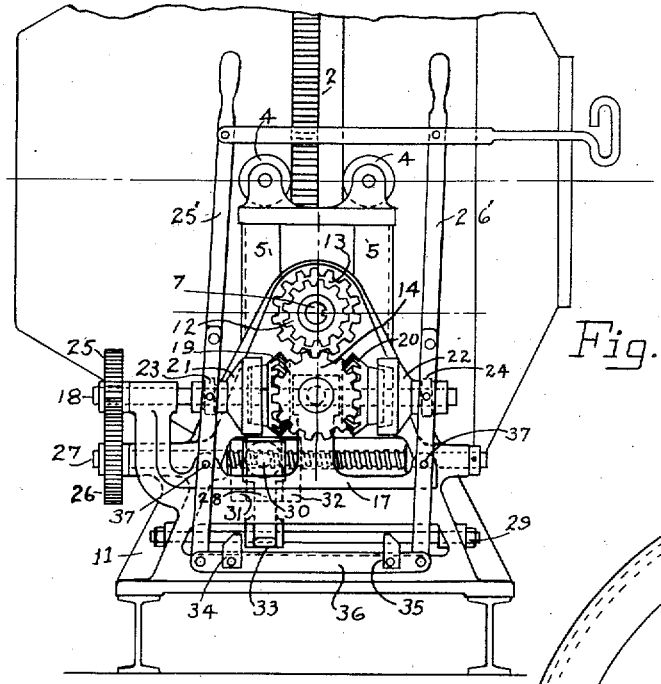
Figure 2:
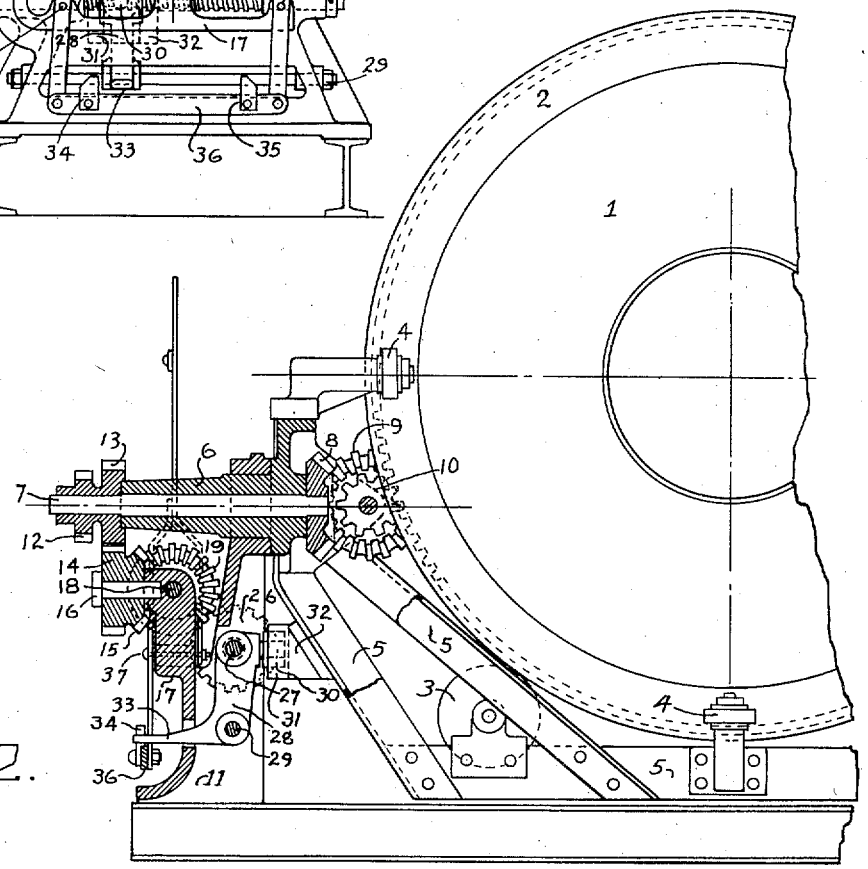

My invention relates to improvements in means for tilting the drum of a concrete mixer to discharge the same and to return the drum to its initial position; and the objects of my invention are to make a simple, durable and efficient machine for this purpose which shall fully satisfy all the limitations imposed on a machine of this character. I attain these objects by the mechanism illustrated in the accompanying drawing which forms a part of this specification, and in which:

Figure 1 shows an end elevation of the machine applied to a concrete mixer. Fig. 2 shows a side elevation of the machine, the parts involved in the tilting mechanism being shown in section on a vertical central plane.

The said reference characters refer to the same parts in the different figures.

1 is the drum of the concrete mixer attached to the gear ring 2 by which it is rotated, supported on rollers 3, only one being shown, and guided by edge rollers 4 in the structural frame 5. This frame 5 is carried by and tiltable around trunnions 6, only one being shown, and the drum is rotated by means of the shaft 7 concentric with the trunnion, miter gears 8 and 9 and the spur pinion 10 engaging the gear ring 2. The trunnions are supported by pedestals 11, one being shown, and the power is applied through the gear 12.

The mechanism described thus far constitutes a rotating concrete mixer which is tilted to discharge, which forms no part of my present invention, and is illustrated merely to show the application of my device. Further detailed description of the mixer is, therefore, unnecessary.

On the driving shaft 7 of the machine which is to be tilted is placed a gear 13 which drives and operates the tilting mechanism through the spur gear 14 and its attached miter gear 15 rotating on the pin 16 which is secured in the bracket 17 which forms a part of, or is attached to, the pedestal 11. Also supported in bearings on the bracket 17 is the clutch shaft 18 on which the miter gears 19 and 20 revolve loosely in opposite directions, but are restrained from longitudinal movement along the shaft. Each of these gears has its hub formed to constitute a tapering friction member over which the hollow or cup-like friction members 21 and 22 are adapted to engage. These cup members are splined on the clutch shaft to revolve therewith and are movable along the shaft by split collars 23 and 24 engaging grooves in the hubs of the cup members, and also pivoted in the levers 25 and 26. It is obvious that as the gears 19 and 20 with their friction members revolve in opposite directions, the shaft 18 will revolve in one direction or the other, according to which cup friction member is engaged, or will not revolve at all when both cup friction members are disengaged. The gears 25 and 26 on the clutch shaft and screw shaft 27 respectively communicate the movement of the former to the latter. This screw shaft is housed in bearings on the pedestal 11, and has in engagement with its threads a nut 28 which is guided by and slides freely on a rod 29. A lug projects from this nut and carries an anti-friction roller 30 engaging in a slot or groove 31 in the bracket 32 which is secured to the swinging trunnioned frame 5. Thus as the nut 28 travels one way or the other along the screw it swings the frame 5 and drum 1 in a corresponding direction. In order to limit the motion of the nut and consequently the tilting of the drum, the nut carries a projecting finger 33 which engages alternately with two tappets 34 and 35 which are disposed on a link 36 connecting the lower ends of the levers 25′ and 26′, which levers are pivoted on the bracket 17 at fulcrums 37. The tappets 34 and 35 are so disposed that they will be engaged by the finger 33 when the drum is in its limiting positions, and further movement of the nut disengages the clutch and the drum remains either tilted or level in the position in which it was left by the tilting mechanism until the operator, by means of the attached levers 25′ and 26′, engages the clutch which was disengaged during the previous operation.

There are several limitations to which this device is subjected, all of which are perfectly provided for. The frame must be locked when the clutches are disengaged to maintain the drum in exact position for loading and discharging, and this feature is provided for by the screw and nut engagement. The large speed reduction from the driving shaft is also conveniently provided for by the screw. The disengaging tappets are operated by a part that has a long range of motion, and the entire tilting device is self contained with the machine which it operates. If in emergency it becomes necessary to tilt the machine by hand, this can be done by removing the gear 25 and attaching spokelike handles to the gear 26, or anywhere on the screw shaft 27.

Having now fully described a practical form, which the invention may take, what I claim as my invention is:

1. In combination with a machine to be tilted, a tilting device comprising a screw and nut, actuating means for rotating said screw in either direction, means on the part to be tilted adapted to engage said nut, and means for disengaging said screw from its actuating means.

2. In combination with a machine to be tilted, a tilting device comprising a screw and nut, actuating means for rotating said screw in either direction, means on the part to be tilted adapted to engage said nut, and means actuated by said nut for disengaging said screw from its actuating means.

3. In a concrete mixer, a continuously rotated drum, supporting means for the drum, driving mechanism for the drum, means for intermittently tilting said drum comprising a screw and nut, the latter engaging the supporting means of the drum, and means actuated by the driving mechanism of the drum for rotating the screw in either direction.

4. In a concrete mixer of the tilting type, a rotatable drum, a tiltable support, a driving mechanism for said drum, tilting means comprising a screw, a train of mechanism actuated by the driving mechanism and terminating in oppositely rotating gears on a common axis, means adapted to actuate said screw from either of said oppositely rotating gears, and intermediate means engaging said screw and engaging said tiltable support.

5. In a concrete mixer of the tilting type, a rotatable drum, a tiltable support, a driving mechanism for said drum, tilting means comprising a screw, a train of mechanism actuated by the driving mechanism and terminating in oppositely rotating gears on a common axis, means adapted to actuate said screw from either of said oppositely rotating gears, intermediate means engaging said screw and said tiltable support, and automatic means disengaging said screw from its actuating means when said tilting support is at either limit of its movement.

6. In a concrete mixer of the tilting type, a rotatable drum, a tiltable support, a driving mechanism for said drum, a tilting device comprising a screw and nut, means actuated by the driving mechanism for rotating said screw in either direction, means on the tiltable support adapted to engage said nut, and means actuated by said nut for disengaging said screw from its actuating means at each limit of the tilting movement.

7. In a concrete mixer of the tilting type, a rotatable drum, driving means therefor, a part to be tilted, a tilting device comprising a screw, means actuated by the driving means adapted to rotate said screw in either direction, intermediate means engaging said screw and the part to be tilted, and means moving synchronously with said intermediate means adapted to disengage said screw from its actuating means at each limit of the tilting movement.

EDWARD WINGFIELD BRACKENBURY.

Witnesses:
LLOYD H. DRAEGER,
ARNOLD REUSS.